United States Patent
Arnold et al.

(10) Patent No.: US 8,770,217 B2
(45) Date of Patent: Jul. 8, 2014

(54) APPARATUS AND METHODS FOR PURGING AIR FROM A FLUID CONVEYING TUBE

(75) Inventors: Christopher J. Arnold, Vancouver, WA (US); Gregory K. Justice, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 725 days.

(21) Appl. No.: 12/863,560

(22) PCT Filed: Jan. 31, 2008

(86) PCT No.: PCT/US2008/052560
§ 371 (c)(1),
(2), (4) Date: Jul. 19, 2010

(87) PCT Pub. No.: WO2009/096965
PCT Pub. Date: Aug. 6, 2009

(65) Prior Publication Data
US 2010/0283822 A1    Nov. 11, 2010

(51) Int. Cl.
*F16K 24/04*  (2006.01)
*B41J 2/19*   (2006.01)
*B41J 2/17*   (2006.01)

(52) U.S. Cl.
CPC .............. *F16K 24/04* (2013.01); *B41J 2/1707* (2013.01); *B41J 2/19* (2013.01)
USPC ................. 137/199; 347/84; 347/92

(58) Field of Classification Search
CPC .......... B41J 2/19; F16L 155/07; F16K 24/44; B41J 2/1707
USPC ..................... 137/197, 199; 347/92
See application file for complete search history.

(56) References Cited

U.S. PATENT DOCUMENTS

| | | | | |
|---|---|---|---|---|
| 2,635,620 | A | * | 4/1953 | Deardorff ...................... 137/197 |
| 3,948,147 | A | * | 4/1976 | Sauer et al. ................... 137/197 |
| 4,320,407 | A | | 3/1982 | Goldis et al. |
| 5,621,445 | A | | 4/1997 | Fong et al. |
| 5,877,795 | A | | 3/1999 | Gragg et al. |
| 5,886,718 | A | | 3/1999 | Johnson et al. |
| 5,905,518 | A | | 5/1999 | DeFilippis |
| 5,984,462 | A | | 11/1999 | DeFilippis |

(Continued)

FOREIGN PATENT DOCUMENTS

| | | |
|---|---|---|
| EP | 0603910 A1 | 6/1994 |
| EP | 1847370 A2 | 10/2007 |

(Continued)

*Primary Examiner* — Shelby Fidler (57) ABSTRACT

An apparatus for purging air from a fluid conveying tube includes a housing member comprising an inner bore having an inlet and an outlet (115); and a vented piston member slidably disposed within the inner bore, the vented piston member comprising a filter element and at least one air vent. The filter element is configured to allow air to pass through the vented piston member to the at least one air vent and to prevent fluid from passing through the vented piston member to the at least one air vent. A method of purging accumulated air from a fluid conveying tube includes providing a vented piston member slidably disposed within a housing member; displacing air from the fluid conveying tube through a filter element disposed within the piston member using pressurized fluid; and displacing the piston member with the pressurized fluid; wherein the displacement of the piston member exposes an outlet for the pressurized fluid.

20 Claims, 8 Drawing Sheets

(56) References Cited

U.S. PATENT DOCUMENTS

| | | |
|---|---|---|
| 6,048,055 A | 4/2000 | Hakkaku |
| 6,139,138 A | 10/2000 | Powers et al. |
| 6,270,211 B1 | 8/2001 | Long et al. |
| 6,481,837 B1 | 11/2002 | Askren et al. |
| 7,241,000 B2 | 7/2007 | Hirota et al. |
| 2005/0083367 A1 | 4/2005 | Nakamura |
| 2005/0157130 A1 | 7/2005 | Inoue |
| 2005/0264626 A1 | 12/2005 | Childs et al. |
| 2006/0024211 A1* | 2/2006 | Giter et al. .................... 422/104 |
| 2006/0044367 A1* | 3/2006 | Campillo et al. ............... 347/85 |
| 2007/0046747 A1* | 3/2007 | Takemoto ...................... 347/92 |
| 2008/0041456 A1* | 2/2008 | Dumrath ...................... 137/176 |

FOREIGN PATENT DOCUMENTS

| | | |
|---|---|---|
| GB | 2112715 A | 7/1983 |
| JP | 2005-186480 A | 7/2005 |
| WO | 88/08515 A1 | 11/1988 |

\* cited by examiner

APPARATUS AND METHODS FOR PURGING AIR FROM A FLUID CONVEYING TUBE

RELATED APPLICATIONS

The present application claims the priority under 35 U.S.C. 119(a)-(d) or (f) and under C.F.R. 1.55(a) of previous International Patent Application No.: PCT/US2008/052560, filed Jan. 31, 2008, entitled "Apparatus and Methods for Purging Air from a Fluid Conveying Tube", which application is incorporated herein by reference in its entirety.

BACKGROUND

Various devices in a wide variety of applications are used to selectively dispense a metered amount of a fluid. For example, an inkjet printer is a printing machine in which a printhead assembly is commonly mounted on a moveable printing carriage. As the carriage moves with respect to a print medium, such as paper, the printhead assembly selectively dispenses droplets of liquid ink onto the print medium to form a desired image. The printhead can be incorporated into a replaceable cartridge that can be coupled to the moveable carriage when installed.

There are multiple configuration possibilities for such inkjet printing systems, including on-axis and off-axis configurations. In the on-axis configuration, a cartridge having a printhead is mounted on the moveable carriage, or a replaceable ink supply cartridge mounts to the printhead. The cartridge contains an internal ink reservoir, and the entire cartridge is replaced when this internal ink reservoir is exhausted.

The off-axis configuration features an ink reservoir mounted off the printhead. The off-axis ink reservoir intermittently or continuously supplies ink through a conduit, typically a flexible ink conveying tube, to the inkjet printer's printhead.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

In some cases, inkjet printer manufacturers ship inkjet ink delivery systems "wet," meaning the printhead cartridge, and possibly the ink conveying tube, contains ink. A customer may then easily begin operating an inkjet printer that arrives with a printhead cartridge that was shipped wet. However, it has been observed that such protracted and continuous exposure to ink may have deleterious effects on the structural and electrical integrity of the printhead cartridge, the ink conveying tube, and the ink contained in the printhead cartridge. Moreover, shipment of a "wet" printhead system increases the likelihood of vapor transmission losses and air gain in the ink conveying tube and ink.

Due to the negative consequences of shipping ink delivery systems wet, it may be advantageous to ship them "dry," or without ink in the ink conveying tube. In a dry shipment of an off-axis printer or ink delivery system, the ink conveying tube is thus filled with air instead of ink.

Shipping ink conveying tubes dry eliminates their exposure to printing ink chemicals and substantially reduces the possibility of vapor transmission loss and air gain prior to a consumer using the printer. In situations where ink tubes are shipped dry, the ink conveying tubes must be primed with ink prior to becoming operative. During priming, air and/or other gases are replaced by liquid ink in the ink conveying tube.

If an effort is made to expel accumulated air from the ink conveying tube during a priming operation before attaching the tube to the printhead, the ink conveying tube may spill or drool. This may potentially result in an unnecessary loss of ink and/or the soiling of or damage to printer components. Thus, it may be particularly advantageous to prime an ink conveying tube.

To accomplish the above goals, the present specification discloses illustrative apparatus and methods of purging air from an ink conveying tube that was shipped dry and which is fluidly connected to a printhead cartridge. The apparatus may include a housing member having a first inner bore and a vented piston member slidably disposed within the first inner bore of the housing member. The vented piston member may include a second inner bore, at least one air vent, and a filter element disposed within the second inner bore. The filter element may be configured to allow air to pass from the second inner bore through the at least one air vent and prevent ink from passing or substantially restrict its flow from the second inner bore through the at least one air vent.

Using the apparatus and methods of the present specification, accumulated air in an ink conveying tube is completely purged from both the ink conveying tube and the printhead assembly without customer intervention. Particularly, the customer need not, as has been the case in some systems, connect the tube to a blank or dummy printhead cartridge during which the priming is connected and then connect the primed tube to the real printhead cartridge for printing operations.

As used in the present specification and in the appended claims, the term "fluid interconnect" refers to a conduit configured to allow the conveyance of a fluid, such as ink from a supply source to another destination. As will be appreciated by those skilled in the art, the principles disclosed herein may be used in any of a variety of fluid delivery and dispensing systems, not just inkjet printing systems, where it is advantageous to prime a fluid supply tube and dispensing head as a unit.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to illustrative apparatus and methods.

Illustrative Apparatus

Figure 1:
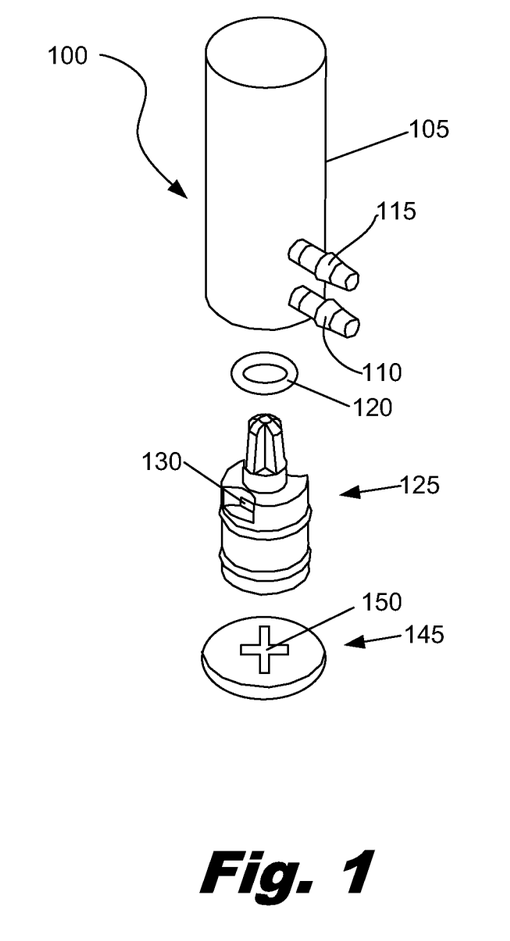
FIG. 1 is an exploded view of an embodiment of an illustrative apparatus for purging air from an ink conveying tube, according to principles described herein.

Referring now to FIG. 1, an exploded view of an illustrative apparatus (100) for purging air from a fluid conveying tube is shown. As noted above, the apparatus (100) described may be particularly useful in an inkjet printing system for purging air from an ink conveying tube that was shipped dry in an off-axis printing system. However, while this example of an inkjet printing system will be described in more detail below, it will be readily appreciated by those skilled in the art at the apparatus and techniques described herein may be used in any of a variety of fluid dispensing systems that incorporate a fluid conveying tube and dispensing head that need to be primed or purged of air prior to operation.

In some embodiments, the apparatus (100) may include a cylindrically or otherwise shaped housing member (105). The housing member (105) may include an inlet (110) configured to couple, for example, with an ink or other fluid conveying tube that provides ink from an auxiliary ink supply reservoir. The housing member (105) may further include an outlet (115) configured, for example, to supply ink received through the inlet (110) from a coupled ink conveying tube to an inkjet printhead. The illustrative apparatus (100) may be configured to supply fluid from the inlet (110) to the outlet (115) where the fluid supplied to the outlet (115) is substantially primed and free of air bubbles or pockets.

Figure 4:
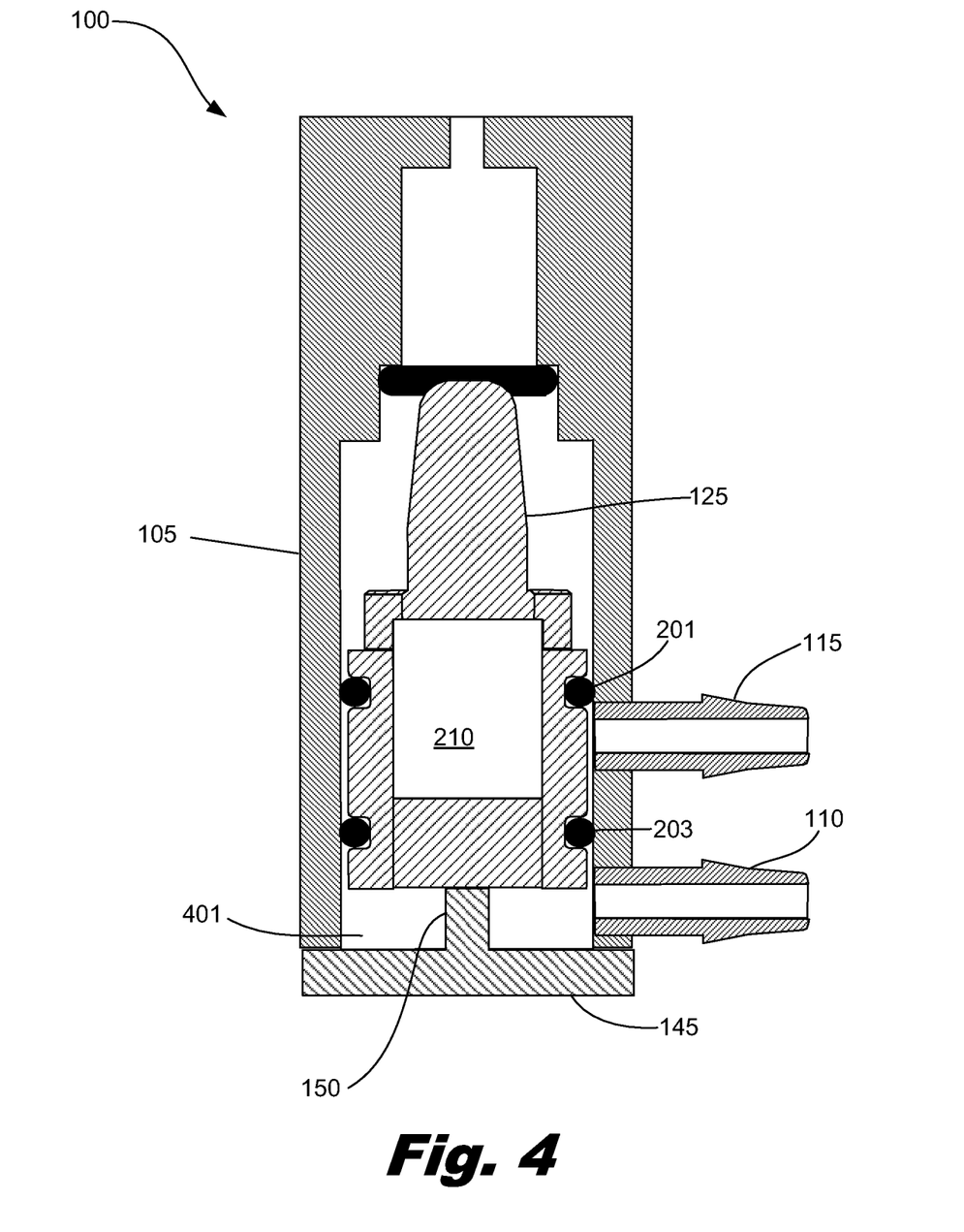
FIG. 4 is a cross-sectional view of an embodiment of an illustrative apparatus for purging air from an ink conveying tube, according to principles described herein.

The housing member (105) has defined therein a first inner bore (shown in FIG. 4). The inlet (110) and the outlet (115) are each in fluid communication with the first inner bore.

The illustrative apparatus (100) may further include a vented piston member (125) configured to be coaxially disposed within the inner bore of the housing member (105). The relative diameters of the inner bore of the housing member (105) and the vented piston member (125) may be such that the vented piston member (125) may slide axially within at least a portion of the inner bore of the housing member (105), according to fluid pressure against a bottom surface of the piston member (125), as will be described in more detail below.

The inner bore of the housing member (105) may be configured to house an upper air seal (120), which may be configured to engage an upper vertex of the vented piston member (125). The apparatus (100) may also include a cap member (145) configured to engage the base of the housing member (105). The cap member (145) may have a protrusion (150) extending upward from an inner surface, such that the vented piston member (125) may rest upon the protrusion (150) without contacting the greater surface of the cap member (145).

As will be explained further in the following figures, the apparatus (100) may be configured to purge air out of the ink conveying tube coupled to the inlet (110). As ink from an ink reservoir is pressurized and pumped through the inlet (110), existing air within the ink conveying tube and/or ink reservoir may be pumped into the inner bore of the housing member (105) and exit through one or more air vents (130) of the vented piston member. Once the air has been vented, the vented piston member (125) may be displaced within the housing by the subsequent flow of fluid such that a fluid path is created between the first interconnect (110) and the outlet (115).

As noted above, the apparatus (100) may also include an upper air seal (120) configured to be disposed above the vented piston member (125). The air seal (120) may be configured to allow the vented piston member (125) to rise upward until an impermeable seal is formed.

Figure 2:
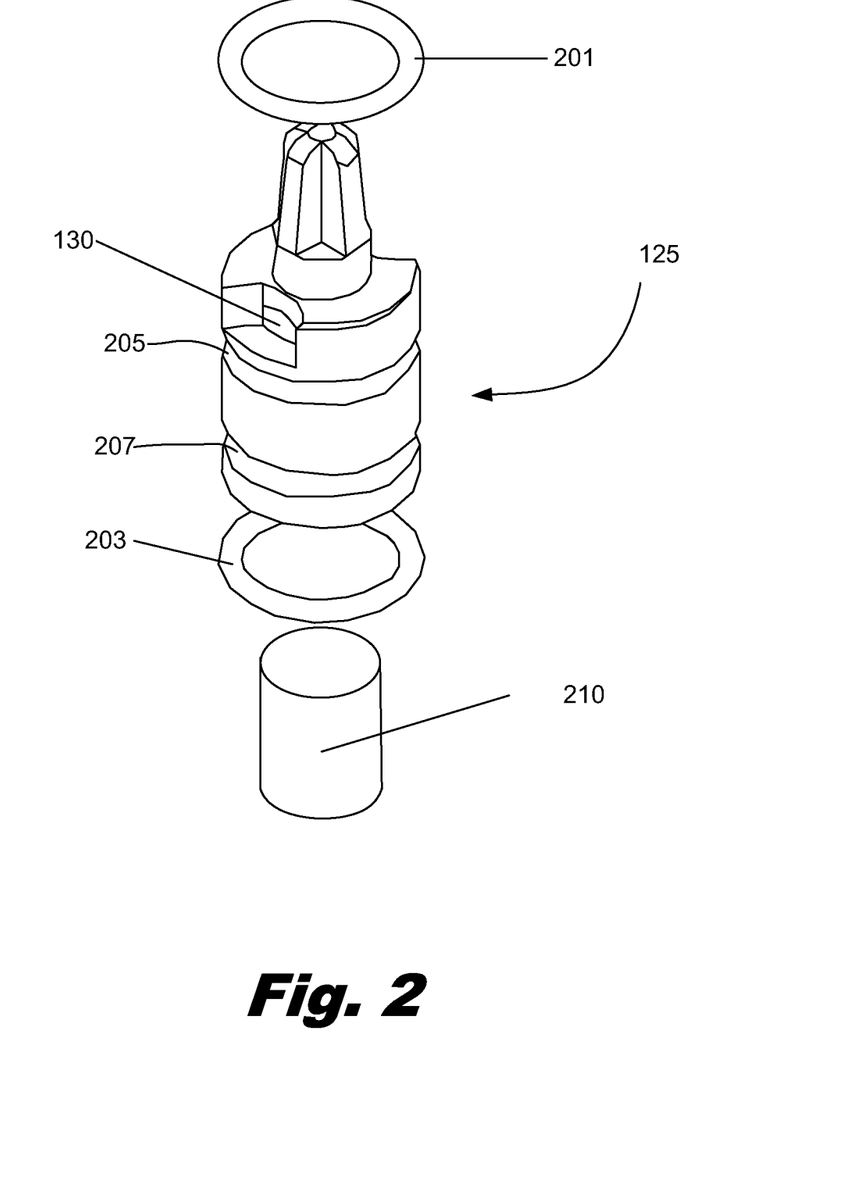
FIG. 2 is an expanded view of an embodiment of an illustrative vented piston member assembly, according to principles described herein.

Referring now to FIG. 2, an exploded view of the illustrative, vented piston member (125) is shown. In addition to the upper air seal (120, FIG. 1) described above, the vented piston member (125) may be configured to accommodate piston seals (201, 203) that are concentrically disposed about the outer circumference of the vented piston member (125). For example, the vented piston member (125) may include a first groove (205) configured to house a first piston seal (201) above the first and outlets (110, 115). The vented piston member (125) may also include a second groove (207) configured to house a second piston seal (203). The second piston seal (203) may be initially below the outlet (125), but may move past the outlet (125) as will be described in more detail below. The piston seals (201, 203) may be configured to substantially prevent the passage of liquid ink and/or air between the outer surface of the vented piston member (125) and the inner surface of the housing member (105, FIG. 1).

The seals (201, 203) may have an outer circumference substantially equal to that of the inner bore of the housing member (105, FIG. 1) along an expected displacement path of the vented piston member (125). In some embodiments, the seals (201, 203) may be manufactured with an outer circumference that is slightly greater than that of the inner bore of the housing member (105, FIG. 1), such that the seals (201, 203) may be slightly compressed between the vented piston member (125) and the inner bore of the housing member (105, FIG. 1). The vented piston member (125) may be configured such that fluid pressure exerted against the bottom portion of the vented piston member (125) may cause a displacement of the vented piston member (125) within the inner bore of the housing member (105, FIG. 1).

As mentioned above, air from an ink conveying tube coupled to the inlet (110, FIG. 1) may be purged through one or more vents (130) in the vented piston member (125), which may be configured to permit the egress of air from within the vented piston member (125). In the present example, the vented piston member (125) includes two air vents (130) disposed on opposite sides of the top portion of the vented piston member (125). However, in other embodiments more or fewer air vents may be used according to the needs of a particular application.

The vented piston member (125) is configured to house a filter element (210). The filter element (210) may be configured to allow the passage of air or other gases therethrough, but prevent or substantially restrict the passage of liquids, such as ink from the ink conveying tube. For example, the filter element (210) may be fabricated from a sintered polyethylene and/or a bonded polyethylene fiber. In some embodiments, the filter element (210) may be doped with a salt, such as calcium chloride, such that the filter element (210) may react with liquid ink and form a plug once the liquid ink touches the filter element (210). In other embodiments, any other suitable material may be used for the filter element (210) as may fit a particular application.

Figure 3:
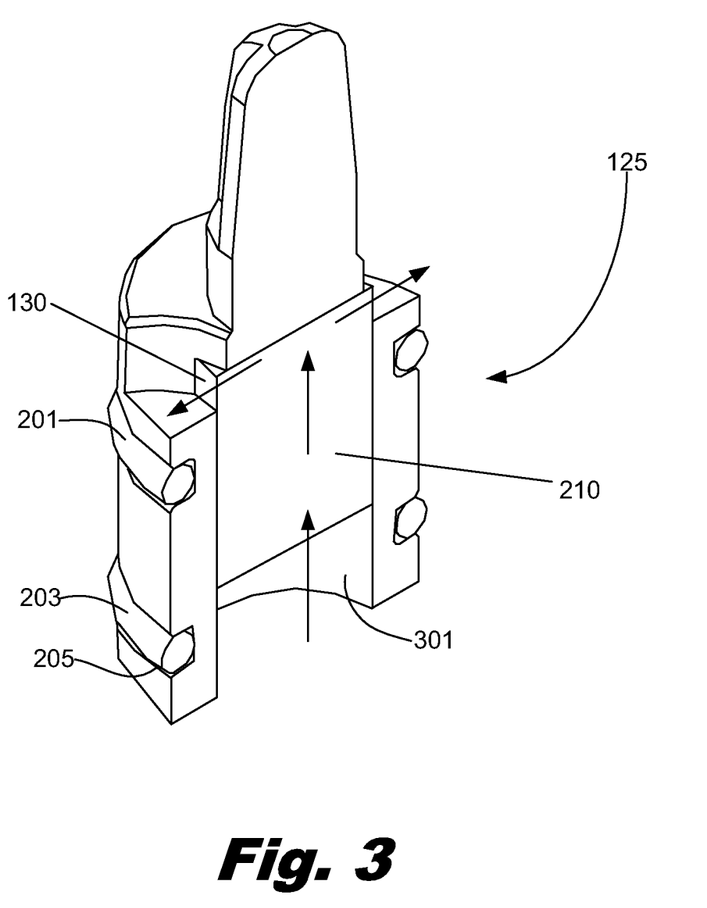
FIG. 3 is a cross-sectional perspective view of an embodiment of an illustrative vented piston member, according to principles described herein.

Referring now to FIG. 3, a cross-sectional perspective view of the illustrative vented piston member (125) is shown. The vented piston member (125) is shown in the present figure with the piston seals (201, 203) disposed within their corresponding grooves (205, 207) and with the filter element (210) disposed within a corresponding space (301) in the vented piston member (125). As mentioned above, the vented piston member (125) may be configured to receive and vent air from the ink conveying tube through the inlet (110, FIG. 1) of the housing member (105, FIG. 1). Due to the presence of the piston seals (201, 203) between the piston member (125) and the interior of the housing member (105, FIG. 1), the venting air may be substantially confined to the path indicated by the arrows in FIG. 3, that is, through the filter element (210) and out the air vents (130) in the vented piston member (125).

Referring now to FIG. 4, a cross-sectional view of the illustrative apparatus (100) for purging air is shown in a configuration in which a manufacturer may ship the device to a customer. As discussed previously, the housing member (105) may include an inner bore (401) configured to house the vented piston member (125). The vented piston member (125) may be located substantially near the bottom of the housing member (105) and substantially resting on the protrusion (150) of the bottom cap member (145). The cap member (145) may be so disposed to prevent the vented piston member (125) from sliding completely to the bottom of the housing member (105).

Thus, the gap between the cap member (145) and the vented piston member (125) may operate to maintain at least a partially open fluid channel between the inlet (110) and the inner bore (401) of the housing member (105). The outlet (115) may be completely sealed from the atmosphere when the apparatus (100) is in its shipping position, the two piston seals (201, 203) forming an impermeable seal between the vented piston member (125) and the inner surface of the housing member (105) that prevent any fluid from the first interconnect (110) from reaching the second interconnect (115). The apparatus (100) may be shipped such that the two seals (201, 203) are disposed on either side of the outlet (115). In some embodiments, the outlet (115) may be shipped wet (filled with ink). In other embodiments, the outlet (115) may be shipped dry (filled with air).

Figure 5:
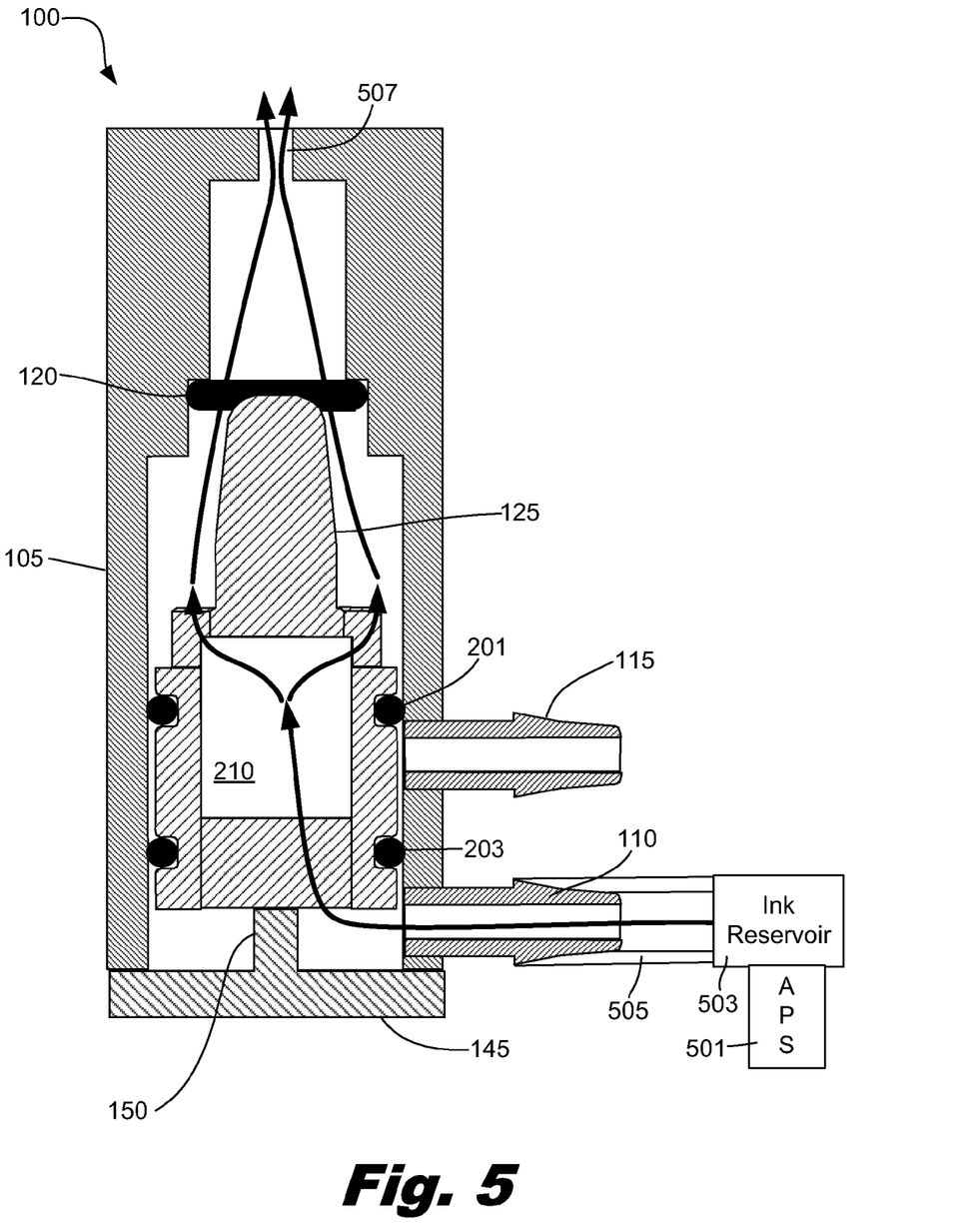
FIG. 5 is a diagrammatic representation of an illustrative step in purging air from an ink conveying tube, according to principles described herein.

Referring now to FIG. 5, the illustrative apparatus (100) for purging air is shown during a first priming step. The priming may commence when the consumer powers a printing device and consequently activates an automatic pressurization system (501). In some embodiments, the automatic pressurization system (501) may be configured to operate at a low-pressure level or a normal-pressure level, depending whether priming is being conducted. Priming is conducted at a lower pressure in such embodiments than normal dispensing operations.

During the first priming step, the automatic pressurization system may operate at the low-pressure level and pressurizes ink in an auxiliary ink supply reservoir (503). The pressurized ink may then migrate from the ink supply reservoir (503) and enter a previously "dry" or air-filled ink conveying tube (505). The pressurized ink may displace air from the ink conveying tube (505), forcing the air to enter the housing member (105) via the inlet (110). The air may be forced further into the vented piston member (125) and subsequently pass through the filter element (210), exit the vented piston member (125) through one or more air vents (130), and exit the housing member (105) through a vent (507) disposed at or near the top of the housing member (105). Meanwhile, the frictional force between the two piston seals (201, 203) and the housing member (105) wall may prevent the vented piston member (125) from moving, causing the outlet (115) to remain sealed.

Figure 6:
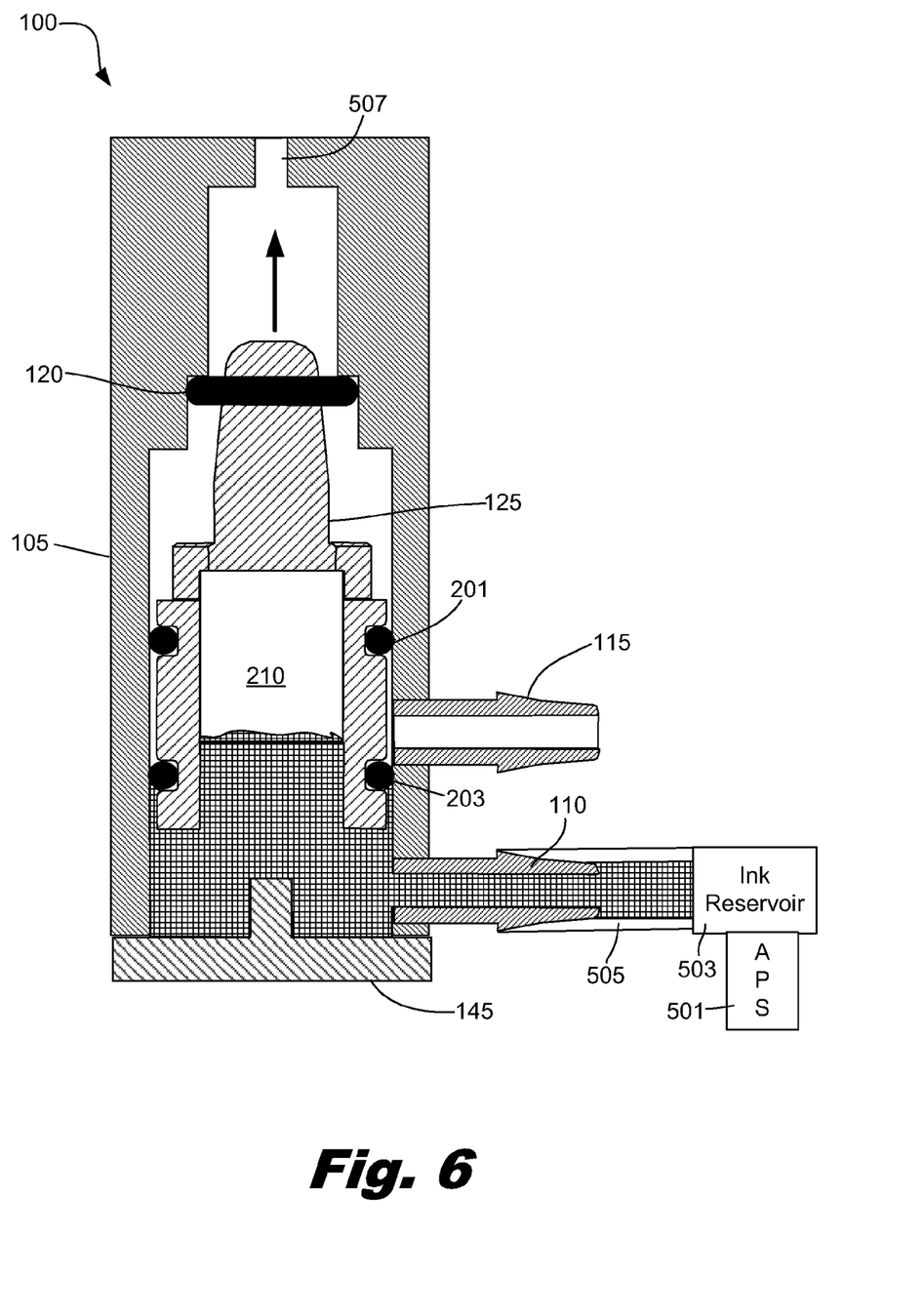
FIG. 6 is a diagrammatic representation of an illustrative step in purging air from an ink conveying tube, according to principles described herein.

Referring now to FIG. 6, the illustrative apparatus (100) for purging air from an ink conveying tube (505) is shown following the commencement of the tube air purging process. Pressurized ink enters the housing member (105) via the inlet (110). When the ink reaches the filter element (210), it may coagulate, forming a plug. Typically, at this point, all the air has been purged from the system through the filter (210) and vent (507). In some embodiments, an automatic pressurization system may then switch from low pressure operation to normal operating pressure or greater than normal operating pressure.

The pressurized ink then may exert a greater pressure on the vented piston member (125) than the frictional force between the two piston seals (201, 203) and the housing member (105), forcing the vented piston member (125) to become axially displaced within the housing member (105) in the direction of the arrow shown in FIG. 6. As the vented piston member (125) rises, pressurized ink may fill the housing member (105).

Figure 7:
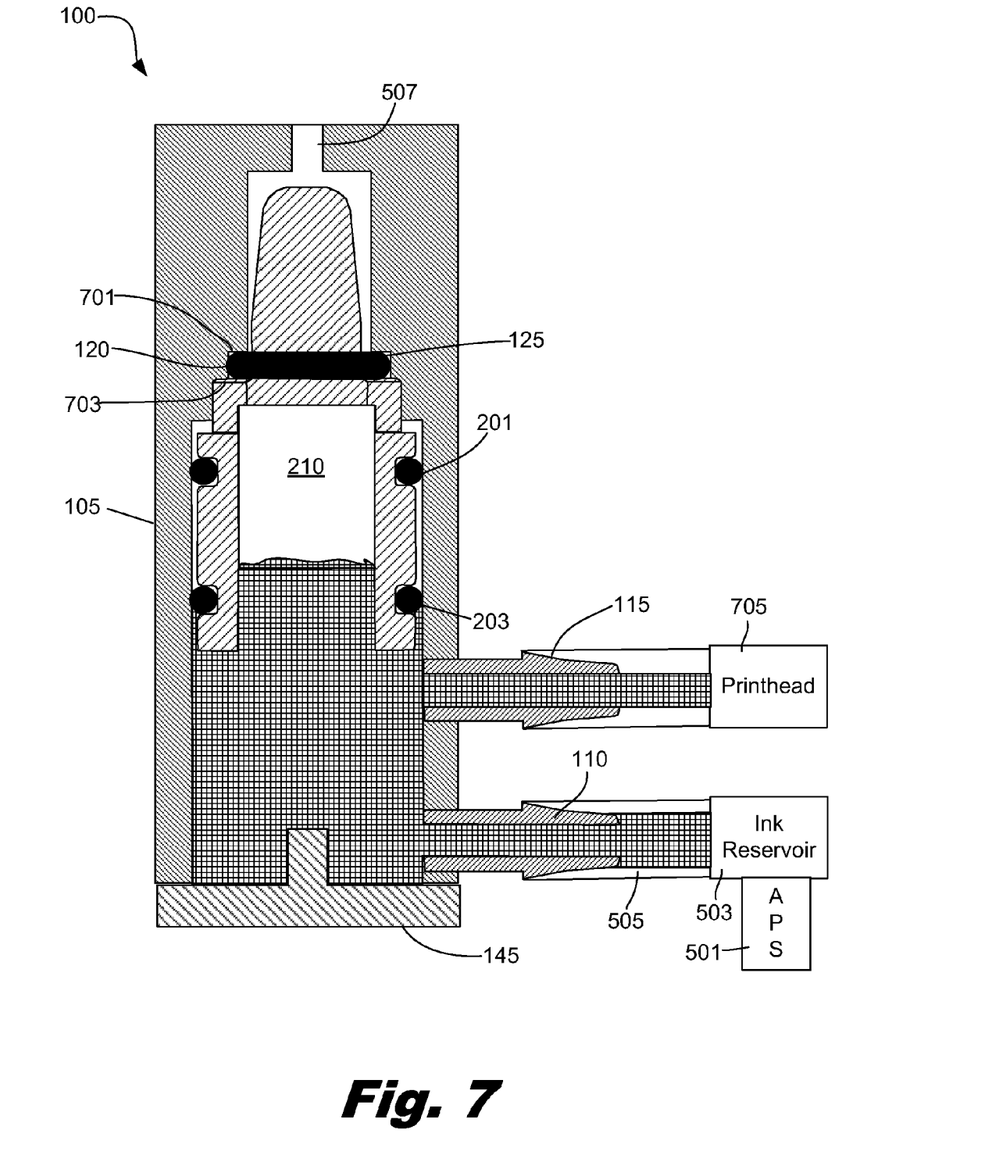
FIG. 7 is a side view of an embodiment of an illustrative apparatus for purging air from an ink conveying tube, shown in a final operating configuration, according to principles described herein.

Referring now to FIG. 7, the illustrative apparatus (100) for purging air (100) is shown at the conclusion of the air tube purging process. The pressurized ink may force the vented piston member (125) to rise to a point such that the outlet (115) is exposed, thereby establishing fluidic communication between the inlet (110) and the outlet (115). The top portion of the vented piston member (125) may pass through the upper air seal (120) as the vented piston is progressively displaced by the pressurized ink The top portion of the vented piston member (125) may have a tapered circumference, thus progressively engaging the upper air seal (120) between a lip (701) in the housing member (105) and a corresponding surface (703) of the vented piston member (125). Once fully engaged, the path between the air vents (130) of the vented piston member (125) and the air vent (507) of the housing member (105) may be sealed, thus providing an additional safeguard against leakage should the filter element (210) or the piston seals (201, 203) degrade over time. Moreover, the upper air seal (120) may prevent the vented piston member (125) from moving to close the outlet (115) during periods of low ink pressure. Primed ink may thus flow from the ink reservoir (503) to one or more inkjet printheads (705) continuously throughout the lifetime of the apparatus (100).

Illustrative Method

Figure 8:
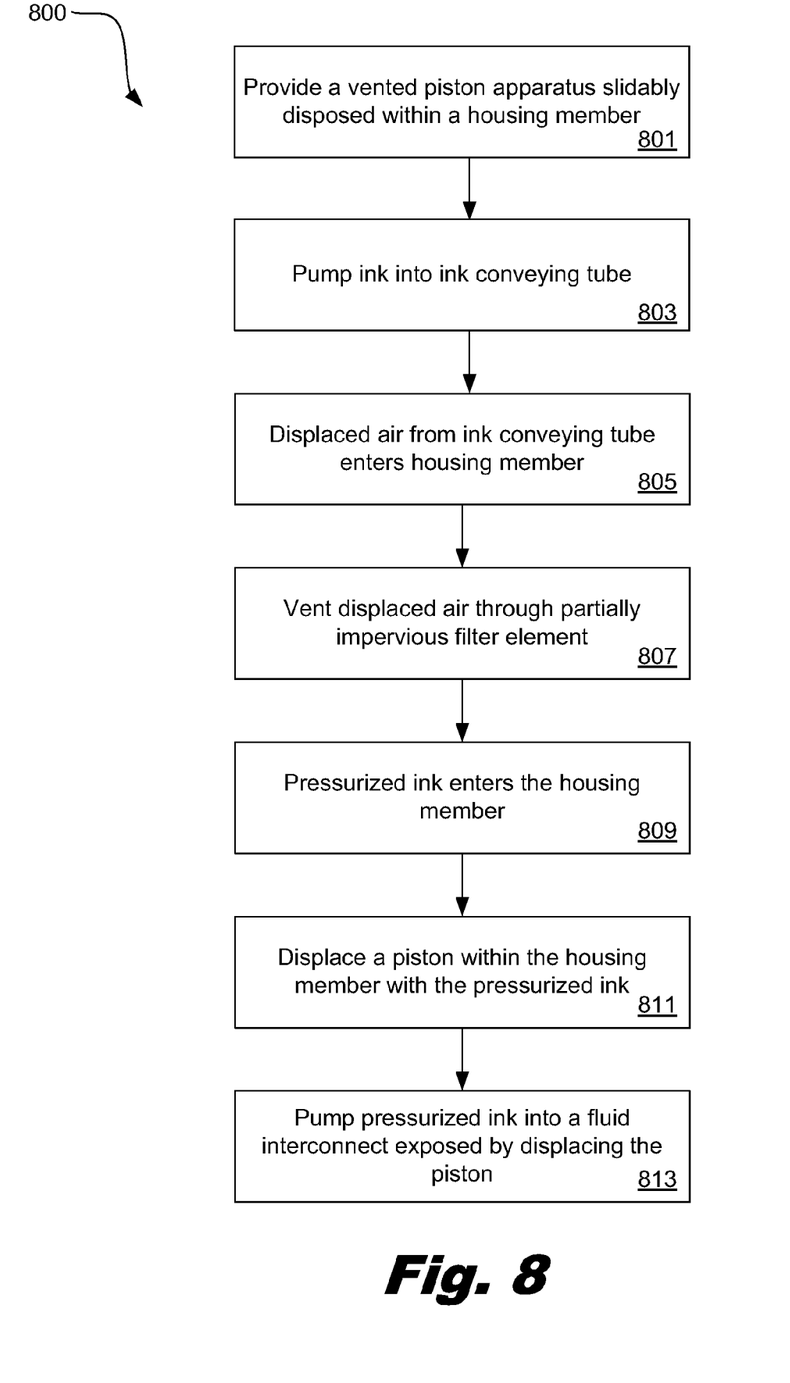
FIG. 8 is a flowchart of an embodiment of an illustrative method of automatically purging air from an ink conveying tube in an inkjet printing device.

Referring now to FIG. 8, a flowchart of an illustrative method (800) of purging air from an ink or other fluid conveying tube is shown. The method (800) includes providing (step 801) a vented piston member slidably disposed within a housing member and pumping (step 803) ink or other fluid into the fluid conveying tube. The ink may be pumped into the conveying tube using an automatic pressurization system (APS) in an inkjet printing device or other pressurization system. The displaced air from the ink conveying tube then enters (step 805) the housing member.

The displaced air is then vented (step 807) through a filter element. The filter element may be configured to allow the passage of air or other gases and to block the passage of fluids, such as ink. Moreover, the filter element may be disposed within the piston member. In some embodiments, the vented air may exit the housing member.

The pressurized ink may then enter (step 809) the housing member and displace the piston member (step 811). The displacement of the piston member may expose a fluid interconnect or outlet, such as an outlet and fluid interconnect leading to an inkjet printhead. The pressurized ink may then be pumped (step 811) into the fluid interconnect exposed by displacing the piston.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. An apparatus for purging air from a fluid conveying tube, said apparatus comprising:
   a housing member comprising an inner bore having an inlet to receiving fluid into the inner bore from said fluid conveying tube and an outlet to output said fluid from said inner bore to said fluid conveying tube; and
   a vented piston member slidably disposed within said inner bore, said vented piston member comprising a filter element and at least one air vent;
   wherein movement of said piston member within said inner bore closes and opens said outlet of said inner bore;
   wherein said filter element is configured to allow air to pass through said vented piston member to said at least one air vent and to prevent fluid from passing through said vented piston member to said at least one air vent.

2. An apparatus for purging air from a fluid conveying tube, said apparatus comprising:
   a housing member comprising an inner bore having an inlet and an outlet; and
   a vented piston member slidably disposed within said inner bore, said vented piston member comprising a filter element and at least one air vent;
   wherein said filter element is configured to allow air to pass through said vented piston member to said at least one air vent and to prevent fluid from passing through said vented piston member to said at least one air vent; and
   wherein said vented piston member is configured to be displaced within said bore by a pressurized fluid received through said inlet.

3. The apparatus of claim 2, wherein said vented piston member is further configured to allow said pressurized fluid to access said outlet in said housing member after said pressurized fluid displaces said vented piston member.

4. The apparatus of claim 2, further comprising a seal for receiving a vertex of said piston member when said piston member is displaced within said bore by said pressurized fluid.

5. The apparatus of claim 2, further comprising at least one seal disposed between said piston member and said housing member.

6. The apparatus of claim 5, further comprising at least two seals disposed between said piston member and said housing member, one of which moves past said outlet to fluid connect said outlet to said inlet when said piston member is displaced within said bore by said pressurized fluid.

7. The apparatus of claim 1, wherein said filter element comprises at least one of: a sintered polyethylene, a bonded polyethylene fiber, a sintered polyethylene doped with salt, and a bonded polyethylene fiber doped with salt.

8. The apparatus of claim 1, wherein a dopant of said filter element is effective to solidify a fluid flowing in said fluid conveying tube.

9. The apparatus of claim 1, wherein said apparatus for purging air further comprises:
   an ink supply fluidly connected to said inlet by an ink conveying tube; and
   a printhead of a printing device fluidly connected to said outlet.

10. The apparatus of claim 9, further comprising a pressurization system for pressurizing ink in said ink conveying tube and said housing member.

11. The apparatus of claim 10, wherein said vented piston member is further configured to slide within said bore when moved by pressurized ink to fluidly connect said inlet to said outlet.

12. The apparatus of claim 11, further comprising an upper piston air seal disposed within said inner bore, wherein said upper piston air seal is configured to engage said vented piston member when said vented piston member is displaced by said pressurized ink.

13. The apparatus of claim 11, further comprising at least two seals disposed between said piston member and said housing member, one of which moves past said outlet to fluid connect said outlet to said inlet when said piston member is displaced within said bore by said pressurized ink.

14. A method of purging accumulated air from a fluid conveying tube, said method comprising:
   providing a vented piston member slidably disposed within a housing member;
   displacing air from said fluid conveying tube through a filter element disposed within said piston member using pressurized fluid; and
   displacing said piston member with said pressurized fluid; wherein said displacement of said piston member exposes an outlet for said pressurized fluid.

15. The method of claim 14, further comprising solidifying said fluid with a dopant in said filter element.

16. The method of claim 14, further comprising fluidly connecting said outlet with a printhead.

17. The method of claim 14, wherein said fluid conveying tube is connected to a printhead cartridge, said method comprising:
   shipping said fluid conveying tube and printhead cartridge dry; and
   performing said purging of accumulated air subsequent to said shipping and prior to operation of said printhead cartridge.

18. The method of claim 14, wherein said filter element comprises at least one of a sintered polyethylene, a bonded polyethylene fiber, a sintered polyethylene doped with salt, and a bonded polyethylene doped with salt.

19. The method of claim 14, further comprising venting said air through a vent in said housing member.

20. The method of claim 14, further comprising capturing said piston member in a seal when said piston member is displaced within said housing member to prevent said piston member from subsequently closing said outlet.

\* \* \* \* \*